Sept. 22, 1959 G. DEGENHARDT 2,905,557
FEED AND PROCESS OF AND APPARATUS FOR PRODUCING SAME
Filed Nov. 7, 1955 2 Sheets-Sheet 2
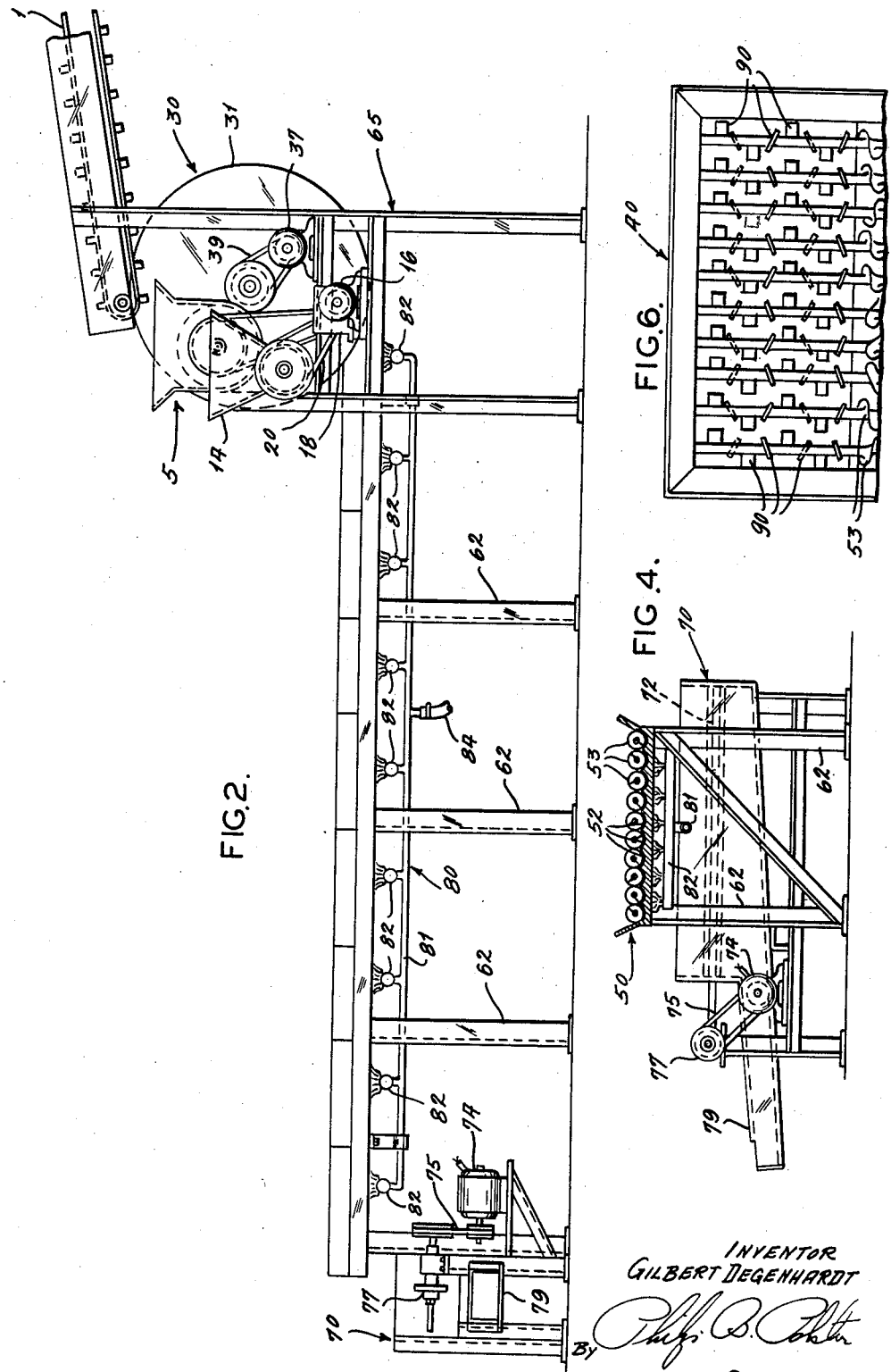
INVENTOR
GILBERT DEGENHARDT
ATTORNEY.

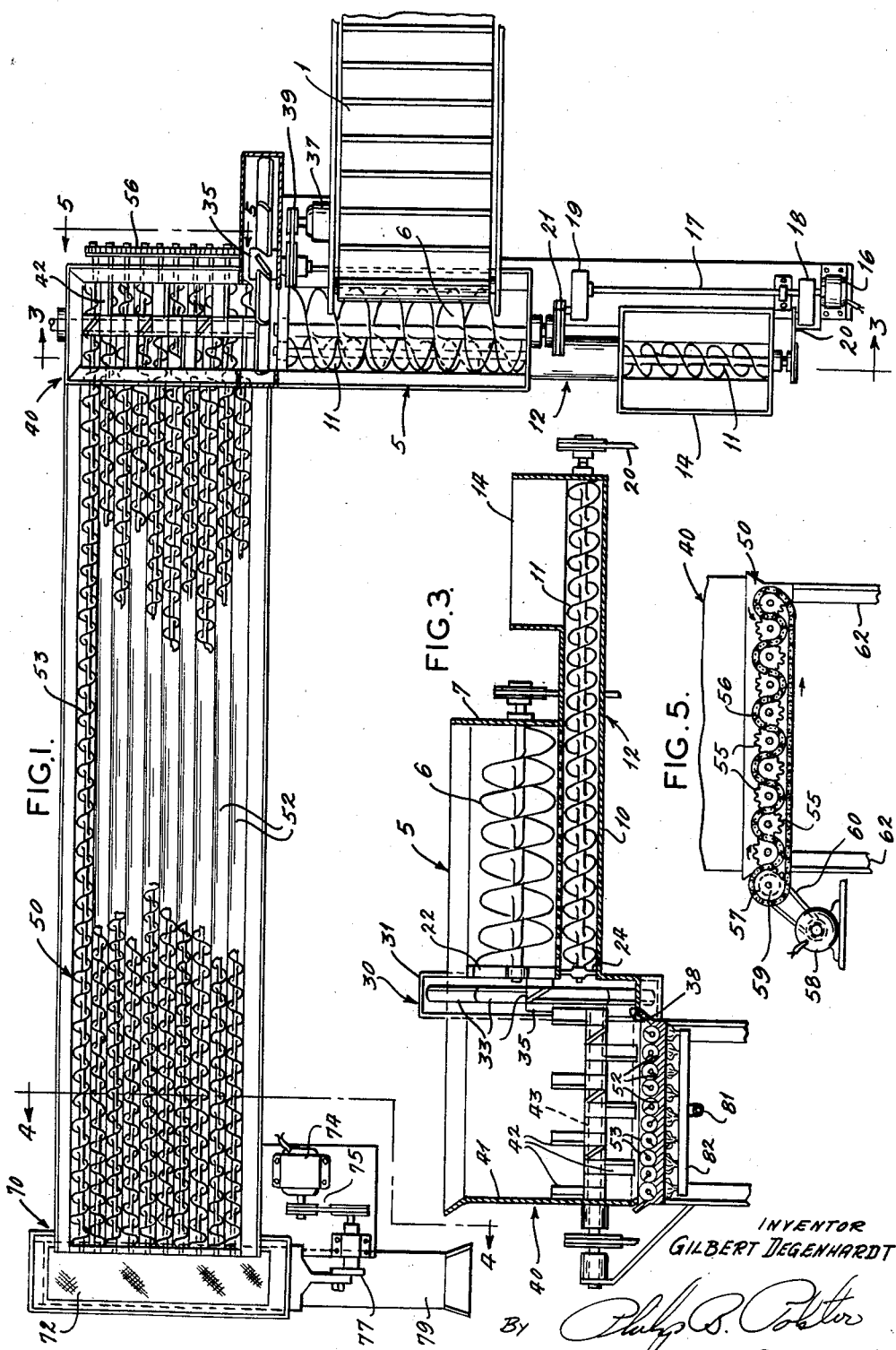

United States Patent Office 2,905,557
Patented Sept. 22, 1959

2,905,557

FEED AND PROCESS OF AND APPARATUS FOR PRODUCING SAME

Gilbert Degenhardt, Yount, Mo.

Application November 7, 1955, Serial No. 545,376

1 Claim. (Cl. 99—2)

This invention relates to the production of animal feed from raw garbage, and to the feed produced.

The disposal of garbage has long been a problem in urban areas of the United States, in spite of the fact that it is potentially valuable. The composition of such garbage seems to be quite uniform. It contains a large amount of valuable nutriments including water-soluble minerals, vitamins, protein from meat scraps, and fats and oils.

It has been customary in years past to feed raw garbage to hogs without preliminary treatment of the garbage. In urban communities, such hog feeding has been a large and profitable business, and has to a large extent solved the garbage disposal problem. However, it has come to be realized that the feeding of untreated raw garbage to hogs has perpetuated and spread diseases of hogs and man, such as vesicular exanthema, trichinosis and tuberculosis. For this reason, most of the States have passed laws prohibiting the feeding of untreated garbage. Many of these laws require that garbage be boiled for a length of time sufficient to kill the harmful organisms. Boiling garbage is a troublesome and unpleasant task for a commercial hog feeder. The resulting product is awkward to handle and practically incapable of being stored economically.

It has been proposed heretofore to dry the garbage in a rotary kiln-type drier, in which raw garbage is fed into one end of a rotating drum, at the other end of which is a blast of flame. This system has been tried, and found to have numerous disadvantages. The liquid which exudes from the garbage in the various stages of its collection and delivery, and which contains much valuable nutriment, has been drained off in order to make the garbage manageable at the feed end of the drier, and this liquid has been thrown away. The garbage tends to build up dams or mud rings in the drum, and lumps and cakes. If the flame is too hot, there is danger of scorching the material, which is exposed directly to the flame, but if the flame is not hot enough, garbage is not dried properly. It is not merely a matter of adjusting the flame. The nature of the garbage is such as to cause alternate hanging up (when the discharge, if any, is too dry) and slides, (when the discharge may be a kind of slop).

One of the objects of this invention is to provide a process for producing a dry animal feed from raw garbage, in which process the nutriment from the liquid garbage heretofore discarded is recovered, in which the germs and parasites are effectively killed and in which the conversion from raw garbage to dried animal feed is rapidly and effectively accomplished.

Another object is to provide such a process in which the fat in the garbage is utilized to lubricate a drier and to prevent scorching of the material, and, at the same time, the fat is incorporated in the feed.

Another object is to provide an apparatus by which liquid garbage may be utilized as a starting material for dried animal feed and by which raw garbage may be converted quickly and effectively to a dry animal feed.

Still another object of this invention is to provide a dry animal feed which is highly nutritious, pleasant smelling, convenient to handle, capable of being stored for extended periods of time, and free from harmful organisms.

In accordance with this invention generally stated, a process for producing a dry animal feed is provided in which the juices from garbage, which juices will be referred to hereafter as "liquid garbage" are soaked up by an absorbent edible material. This wetted mass of absorbent material is then mixed with raw garbage and the mixture is dried, preferably by conveying it over a griddle-like bed heated sufficiently hot to render at least part of the fat and oil that is found in the garbage. This fat is utilized to lubricate the griddle and protect the mixture from scorching. The heating is continued sufficiently to raise the temperature of all of the mixture to what is required to kill the harmful organisms or to meet State law requirements, and to dry the mixture. The absorbent material soaks up any free liquid fat. The dried material is discharged into a suitable receiver.

The dried material is nutritious, without objectionable odor, stable against storage, and convenient in form.

The apparatus by which the feed is produced preferably takes the form of a raw garbage conveyor into which the raw garbage and liquid garbage accompanying it is delivered. The raw garbage conveyor is provided with a foraminous casing through which free liquid can flow into an imperforate casing of an absorbent material conveyor. The absorbent material conveyor and the raw garbage conveyor discharge into a grinder which shreds and to some extent mixes both the raw garbage and the absorbent material and delivers it to a hopper extending across the width of a metal bed or griddle down the length of which a plurality of drying screw conveyors extend. The griddle is heated by any suitable means, preferably open burners on the opposite side from the material to be dried. The drying screw conveyors move the mixture down the length of the griddle at such a rate that the mixture is dry by the time it reaches the discharge end, where it falls into a receiver, which may take any suitable form, such as a hopper, a belt or other conveyor, or the bed of a truck. In the preferred embodiment, the receiver is a hopper provided with a vibrating screen, by which any oversize chunks are retained and from which they are returned to the feed end of the machine. The dried particulate material can be stored in bins, or sacked, or, of course, fed directly to animals.

In the drawings,

Figure 1 is a top plan view partly broken away and partly in section of one illustrative embodiment of machine constructed in accordance with this invention;

Figure 2 is a view in side elevation of the machine shown in Figure 1;

Figure 3 is a sectional view taken along the line 3—3 of Figure 1;

Figure 4 is a sectional view taken along the line 4—4 of Figure 1;

Figure 5 is a fragmentary end view taken along the line 5—5 of Figure 1; and

Figure 6 is a fragmentary top plan view showing the feed end of drying screws equipped with paddles in a modified form of the apparatus of this invention.

Referring now to the drawing for an illustrative embodiment of this invention, reference numeral 1 indicates a drag conveyor upon which raw garbage may be dumped from the containers in which it was collected. The conveyor is made in such a way that any liquid which is dumped on it is delivered to a raw garbage screw conveyor 5, along with the raw garbage. As shown more particularly in Figure 3, the raw garbage screw conveyor 5 is provided with a large screw 6 and a foraminous casing 7 through which the liquid can run into a ground grain screw conveyor 12. The ground grain screw conveyor 12 is provided with an imperforate casing 10 and a screw 11 which is smaller than the screw 6 of the raw garbage screw conveyor 5. The casing 10 and screw 11 of the ground grain screw conveyor 12 extend below and communicate with a ground grain hopper 14. In this embodiment, the screw 6 of the raw garbage screw conveyor 5 and the screw 11 of the ground grain screw conveyor 12 are driven by a single electric motor 16, through a shaft 17, gear boxes 18 and 19 and pulley belts 20 and 21.

Screw conveyors 5 and 12 both discharge through feed ports 22 and 24 respectively into a grinder 30. In the embodiment shown, the grinder 30 has a housing 31 and eight cutting blades 33 extending radially from a hub 35. The hub and blades are rotated by a motor 37 acting through a pulley belt 39. The cutting blades 33 are arranged to move past the ports 22 and 24 at such a rate as to shear material forced through the openings and over an anvil, not here shown, by the screws 6 and 11. The sheared or shredded material is discharged through a discharge opening 38 in the housing 30 into an open-bottomed pug mixer 40. The pug mixer 40 has a trough 41 and a series of arms 42 mounted on a square shaft 43 which is rotatably mounted in the mixer trough. The arms 42 are set at such an angle that material delivered to the pug mixer is moved away from the discharge opening 37 and at the same time the material is mixed and kneaded. The shaft 43 is rotated by a motor, not here shown.

The trough 41 of the pug mixer 40 extends across the width of a bed or griddle 50. In this embodiment, the griddle 50 is made up of a series of sections of cast iron, bolted together to form a continuous flat plate with ten channels 52 running the full length of the assembled griddle. A long screw 53 extends through the full length of each channel 52. In this illustrative embodiment, the screws 53 are shown as being supported only on their two ends by pillow blocks. It is to be understood that the screws may be supported intermediate their length in ways well known to the screw conveyor art. Adjacent screws are pitched and driven in opposite directions so as to move material along the length of the channels without tending to move material across the width of the griddle. A suitable drive by which the alternate directions of turning can be accomplished is shown in Figure 5 in which each of the screws is shown as provided with a sprocket 55, and a chain 56, driven by a drive sprocket 57, passes alternately beneath one sprocket 55 and above the adjacent sprocket 55. The drive sprocket 57 is rotated by a motor 58 acting through a gear box 59 and a pulley belt 60.

The griddle is supported by legs 62 forming a part of a frame 65 by which the various elements of the feed end of the machine are carried as shown particularly in Figure 2.

At the discharge end of the griddle 50 is a receiver 70 which, in the embodiment shown, consists of a hopper provided with an oscillating screen 72 driven by a motor 74 acting through a pulley belt 75 and an eccentric 77. A chute 79 is shown as extending beyond the frame of the hopper for convenience in bagging or delivering to a truck or the like. The chute 79 may also discharge into a storage hopper or a belt conveyor or the like. A thermometer may be positioned below the screen in such a position that it will be contacted by the hot material, by which it can be determined whether the material has reached the proper temperature to ensure that the undesirable organisms have been killed. The griddle at the discharge end may be cooled by artificial means to make the material more convenient to handle, or to put it in condition for immediate use. In that case, the thermometer may be positioned to register the temperature of the material at its hottest point, intermediate the ends of the griddle.

Under the griddle 50 is a burner assembly 80. In this embodiment, the burner assembly 80 consists of a central supply pipe 81 and a series of burners 82 connected to the pipe 81. The burners 82 extend substantially across the width of the griddle 50 and are so arranged that flames from the burners impinge on the lower side of the griddle. Gas, from a source not here shown, is supplied to the central supply pipe 81 through a connection 84. In practice, the burners 82 may be individually controlled to control the amount of heating both longitudinally and laterally of the griddle, and may be automatically controlled, as by thermocouples positioned to respond to the heat of material passing a given point.

The preferred embodiment of apparatus of this invention includes the pug mixer 40. However, especially for small installations, with few drying screws, the pug mixer may be omitted. An alternative apparatus is shown in Figure 6, wherein the shafts of the drying screws beneath the discharge opening of the grinder are shown as equipped with paddles 90 set at a small angle from the axis of the shaft, alternate screws having paddles set at opposite angles. These paddles move material sideways as well as toward the screw flights, to accomplish the same purpose as the pug mixer.

By way of illustration, an operative machine can be made using a nine inch standard pitch raw garbage conveyor screw rotating at four r.p.m. and a four inch standard pitch ground grain conveyor screw rotating at twenty r.p.m., with the pug mixer 40 set to move the material away from the discharge side of the grinder at the rate of four inches per minute. The griddle can be twenty-six feet long, with four inch standard pitch drying screws capable of moving material at about sixteen inches per minute (four r.p.m.).

It is to be understood that the absolute and relative sizes of the screws and their speeds of rotation here given are only illustrative, and that, depending upon the volume and condition of the garbage, the character of the absorbent material used, the temperature and humidity of the ambient atmosphere, and various other factors which may be peculiar to a given installation, location or time, the relative and absolute sizes and speeds of the various elements may be varied. However, these are matters within the expected skill of any mechanic.

The absorbent material can be ground corn or wheat, or a mixture of the two, or any other suitable absorbent edible material. For cows, the garbage must be free of debris. When such garbage is used, shredded or ground news print (suggested in a recent patent to Kamlet, No. 2,715,067), corn cobs, corn stalks, hay or straw may be utilized as the absorbent material for feed for ruminant animals. When corn, wheat, oats, or other grains are used as the absorbent material, the feed can be used for poultry. The terms "ground grain screw conveyor" and "ground grain hopper" are used only to identify the conveyor and hopper but not by way of limiting them to use with ground grain specifically.

The fats and oils found in substantially uniform quantities in all large collections of garbage are utilized in two ways in the drying process of this invention. First, they serve to lubricate the surfaces of the channels and screws of the griddle 50 so as to keep the mass moving steadily toward the discharge end. Second, they serve to protect the material being dried from scorching and thus permit the use of higher temperatures so as to shorten the time required for drying. In operation, the material behaves in much the same way as does food on a hot, well-greased griddle. On the other hand, the absorbent material and the fibrous part of the garbage, when it is dried, serve to soak up any free fat, so that the food value of the fat is not lost.

It is to be understood that the term "dry" as applied to the resultant feed does not necessarily indicate absolute dryness. The resultant product may contain as much (or as little) moisture as is desired for the particular use to which it is to be put, but a moisture content of approximately 10% has been found satisfactory for a material which is capable of being stored without damage for a period of months.

The raw garbage and absorbent material, (which, depending upon the amount of liquid garbage and the kind and amount of absorbent material may be merely damp or may be pasty in consistency) have been described as "shredded" by the grinder 30. The term "shredded" is used broadly to indicate divided material ranging in size from a finely comminuted mass to a roughly chopped mass with pieces perhaps one inch in diameter. Preferably the shredded materials are in such condition that, after being acted upon by the pug mixer or feed end of the drying screws, the resultant product is a homogeneous looking mass of such fineness as to produce a coarse powder at the discharge end of the griddle. As has been indicated, the "ground grain," or absorbent material may be required to take up relatively little liquid or relatively much liquid. In either event, the absorbent material is referred to herein as being "soaked" with liquid garbage, and the term is used to encompass the full operative and practical range of proportions between the liquid and absorbent mass.

Having thus described the invention, what is claimed and desired to be secured by Letters Patent is:

The process of producing animal feed comprising feeding raw, fat-containing garbage to a grinder while concurrently draining said garbage of free liquid, soaking up the said free liquid with ground grain, grinding the raw garbage and the ground grain wetted with said liquid, mixing the ground garbage and grain together, conveying the mixture over and in contact with a hot bed, heating the mixture above the melting point of a substantial part of the fat contained therein; utilizing the fat to lubricate the hot bed, and drying the mixture, bringing the temperature of the mixture to that at which undesirable organisms are destroyed.

References Cited in the file of this patent

UNITED STATES PATENTS

| | | |
|---|---|---|
| 664,262 | Gaunt | Dec. 18, 1900 |
| 761,571 | Anderson et al. | May 31, 1904 |
| 1,057,142 | Geiger | Mar. 25, 1913 |
| 1,365,393 | Gee | Jan. 11, 1921 |
| 2,042,429 | McCullough | May 26, 1936 |
| 2,094,904 | Princell | Oct. 5, 1937 |